March 18, 1952 A. F. PEKRUL 2,590,068
COMBINED BORING AND TURNING TOOL
Filed Jan. 19, 1950 2 SHEETS—SHEET 1

INVENTOR
ARTHUR F. PEKRUL
BY
*Mitchell Burkert*
ATTORNEYS

March 18, 1952      A. F. PEKRUL      2,590,068
COMBINED BORING AND TURNING TOOL
Filed Jan. 19, 1950      2 SHEETS—SHEET 2

INVENTOR
ARTHUR F. PEKRUL
BY
ATTORNEYS

Patented Mar. 18, 1952

2,590,068

UNITED STATES PATENT OFFICE 2,590,068

COMBINED BORING AND TURNING TOOL

Arthur F. Pekrul, New Britain, Conn., assignor to The New Britain Machine Company, New Britain, Conn., a corporation of Connecticut Application January 19, 1950, Serial No. 139,435

3 Claims. (Cl. 77—58)

My invention relates to a rotatable tool head for a boring machine or the like.

It is an object of the invention to provide an improved device of the character indicated.

It is another object to provide an improved rotatable tool head permitting cross-feeding operations during rotation.

It is a more specific object to provide a rotating tool head permitting boring or turning and cross-feeding operations, more or less at the same time.

It is a specific object to make a combination boring (or turning) tool head which may concurrently perform a cross-cut without requiring reaction from the work during a feed of the tool head and of the work relatively to each other.

It is a general object to meet the above objects with a relatively simple well-balanced construction, adaptable to a more or less conventional boring machine and permitting a plurality of different concurrent or successive operations by the same tool head, for a given feeding operation of said head.

Other objects and various further features of novelty and invention will be pointed out or will occur to those skilled in the art from a reading of the following specification in conjunction with the accompanying drawings. In said drawings, which show, for illustrative purposes only, a preferred form of the invention:

Figure 1:
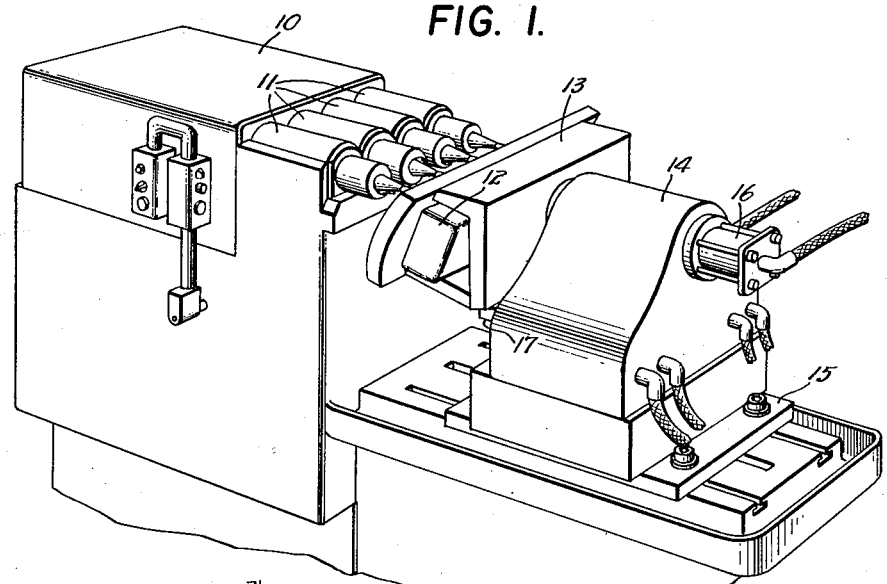
Fig. 1 is a fragmentary view in perspective of a multiple-spindle boring machine to which my invention has been applied.

Briefly stated, my invention contemplates an improved construction for a rotatable tool head. The tool head may include generally transversely directed guide means for movably supporting a slide, and the slide may be generally transversely actuated upon a controlled relative longitudinal movement of two parts of the tool head. When fitted with a suitable tool, the slide may be caused to execute a cross-cut upon relatively stationary work; and, depending upon the transverse inclination of the guide means, and depending upon the relative longitudinal movement, if any, between the tool head and the work during actuation of the slide, various conical cross-cut surfaces may be generated. In the form to be described, my tool head carries a multiplicity of tools for executing a number of different but perfectly concentric cuts during a given tool-head operation. Such cuts may include a boring operation, a plunge-type chamfering operation, and a cross-cut operation.

Referring to the drawings, my invention is shown in application to a multiple-spindle boring machine 10 having a plurality of spindles 11 so as to permit multiple-spindle boring into a single piece of work 12. The piece of work shown happens to be an automobile-type cylinder head, and my invention will be described in connection with the concurrent generation of a number of concentric surfaces for the valve seats and valve-guide holes of such a block 12. It will be understood, however, that the invention may be equally useful in other applications.

In the machine shown, the work piece or cylinder head 12 is supported in a suitable jig or fixture 13, which may be rotatably mounted in a block 14 secured to the work table 15 of the machine. It will be understood that the longitudinal rotary axis of the jig 13 in the block 14 may be suitably located with respect to the valve-guide holes to be bored so that, for the case of a cylinder head requiring the finishing of eight valve seats and guide holes for such seats, four seats and four holes may be operated upon in the position shown in Fig. 1; then, upon a 180° rotation of the jig 13 in the block 14, the remaining four seats and four holes may be similarly uniformly finished. It will be understood that the block 14 and jig 13 may include more or less conventional clamping means for securely holding the jig 13 when in its indexed positions. Such means may include a hydraulic cylinder 16 for axially clamping the rotary axis of the jig 13, and hydraulically actuated locking wedges, as at 17, for locking the jig 13 against rotation.

Figure 3:
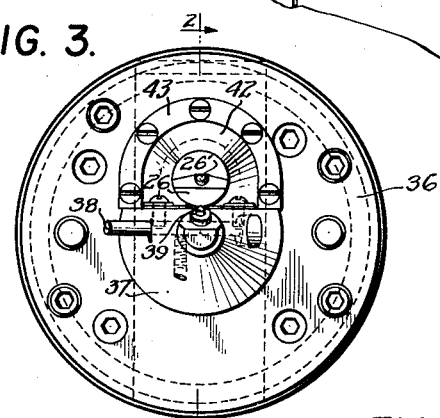
Fig. 3 is a right-end view of the tool-head assembly of Fig. 2, the section of Fig. 2 being taken in the plane 2—2 of Fig. 3.
Figure 4:
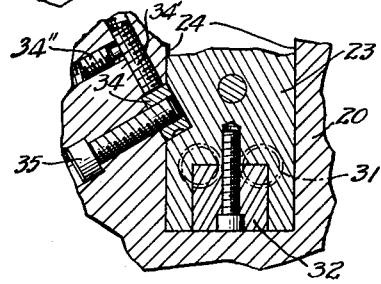
Fig. 4 is a fragmentary sectional view more or less in the plane 4—4 of Fig. 2.
Figure 2:
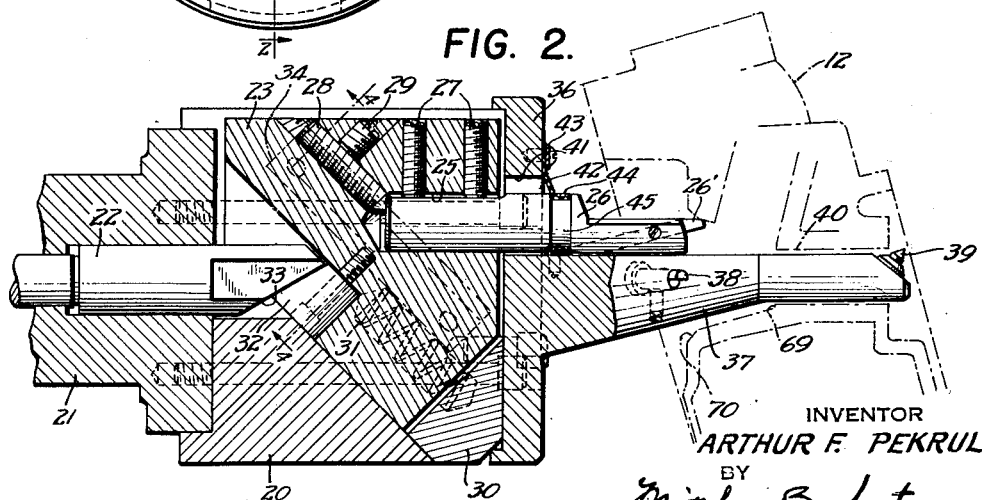
Fig. 2 is a longitudinal sectional view through one of the tool heads of the machine of Fig. 1.

Referring to Figs. 2, 3, and 4, my tool head will be seen to comprise essentially three members. The first two of these members may be controlled for longitudinal movement relatively to each other; in the form shown, the first member may include a head block 20 and an end 21 of one of the spindles 11, while the second member 22 may be a push rod guided for lonigtudinal movement within a bore in the spindle end 21. One of the first two members may include means for generally transversely movably supporting the third or cross-slide member 23, and in the form shown the cross-slide 23 is movable in a longitudinally and transversely inclined guide 24 passing through the head member 20. The slide 23 may include means such as a bore 25 for insertably receiving a tool 26 to be employed for a cross-cut operation, and setscrew means 27 may hold the tool 26 in place. Further screw means 28 may provide an adjustable longitudinal limiting abutment for the back end of the tool 26, and still another set-screw 29 may serve to bind the back-abutment screw 28 when a limiting back abutment has been determined.

At one end of the guide means 24, a stop block 30 may be set and fixedly held to the head 20. Spring means 31 compressionally coacting between the slide 23 and the stop block 30 may serve resiliently to urge the slide 23 in a retracted direction. The slide 23 may carry means, such as a push-rod slide block 32, for coaction with the push rod 22, as along mutually coacting cam-wedge surfaces on the slope 33. An inclined shoe member 34, aligned with the axis of the guide means 24 and suitably fitted against a recess in the slide 23, may serve to hold the slide 23 in the guide means 24, and an adjustment screw 34 may drive the shoe laterally, in order to eliminate possible play between the slide 23 and guide means 24; a set-screw 34'' may hold the adjustment of screw 34', and clamp-screw means 35 may anchor the adjusted shoe 34, as will be clear.

At the forward end of the tool head, I employ a cap member 36 which may be integrally formed with a tool-supporting shank or arm 37 projecting forward of the same end, in the form shown, carrying a first adjustably fixed tool 38 and a second adjustably fixed tool 39; the tool 38 may perform a plunge-type chamfering operation, and the tool 39 may be a boring tool for rough and finish cuts of the valve-guide hole 40. To permit feeding movement of the tool 26 relatively to the front cover plate 36, the latter may be apertured, as at 41, for substantial clearance with the shank of tool holder 26. To prevent entrance of chips or other foreign matter into this clearance space, I have provided a boot 42 of flexible material, and a shield 43 may serve to retain the boot clamped against the front cover member 36, while a snap ring or the like 44 may hold the boot in a suitable recess 45 in the tool holder 26.

It will be seen that with the described head construction, boring and plunge-chamfering operations may be effected upon a purely longitudinal relative displacement of the tool head and of the work 12, while a cross-cut operation (by the tool 26' carried by the cross slide 23) may be effected upon a relative longitudinal movement of the push rod 22 and of the head assembly 20—21—36.

Figure 5:
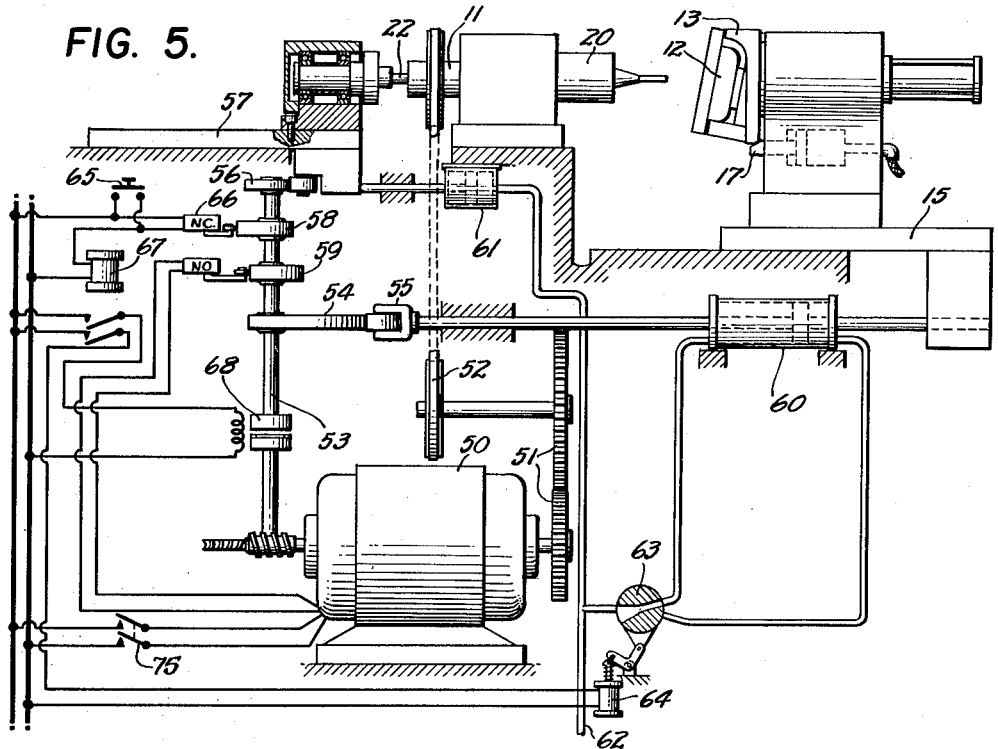
Fig. 5 is a more or less diagrammatic view of actuating and control means for the machine of Fig. 1.

My invention may be better understood from a description of a typical sequence of operations with the machine of Fig. 1. As seen in Fig. 5, the spindles 11 may be rotated continuously by an electric motor 50, as through change gears 51 and belt-and-pulley means 52. At the same time, the motor 50 may, through worm and worm-wheel gearing means, drive a main camshaft 53 for rotating the program elements of the machine. The program means may include a main table-feed cam 54, with follower means 55 directly connected in actuating relation with the work-supporting table 15. Also on the camshaft 53 may be a cross-cut feed cam 56 for actuating a table or slide 57 in longitudinal displacing relation with the push rod 22 for actuating the cross-cut slide 23. Further, there may be cams 58—59 for operation of certain switches useful in automatic electrical operation of the machine.

In the form shown, both cam followers are urged by fluid pressure against the cams 54—56, as by a cylinder 60 for the cam follower 55 and as by a cylinder 61 for the cross-cut feed mechanism. Normally, that is, when both followers are tracking the cams 54—56, fluid-pressure means 62 connected to the cylinders 60—61 may apply the cam followers against the cams 54—56, as will be clear. For purposes of retracting the work fixture 13 clear of the tools (and away from control by cam 54) at the end of a cutting operation, the cylinder 60 may be double-acting, and reversing-valve means 63 may be employed for a full retraction of the work table 51 regardless of cam operation. The placement of reversing-valve means 63 may be governed by a solenoid 64, as will be clear.

Figure 6:
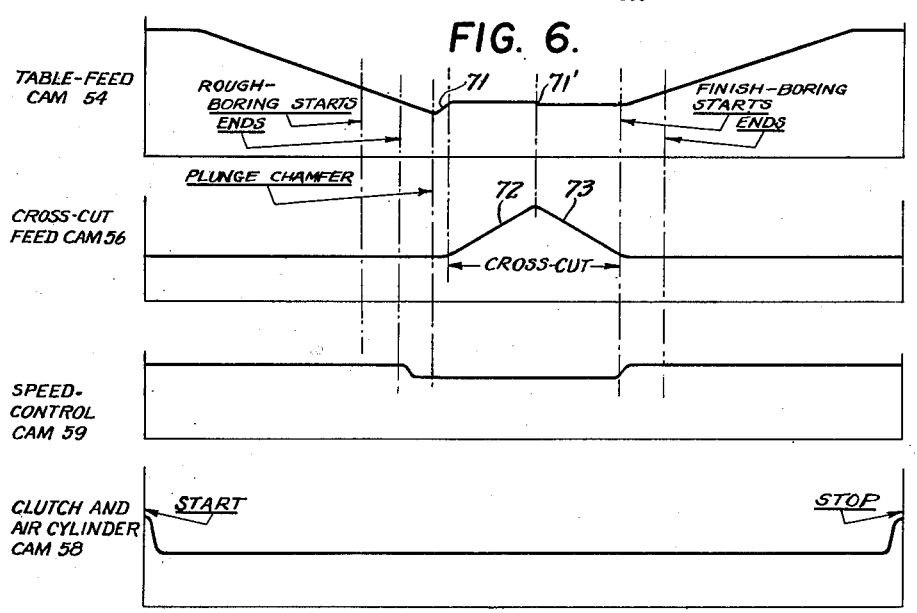
Fig. 6 is a program layout of several of the cams of Fig. 5 illustrating cooperation of the parts.

In Fig. 5, the machine is shown in readiness for initiation of a multiple-station boring operation on the work 12, and to start the motor a switch 75 may be operated. To start a program, the push button 65 may then be depressed, thereby operating a relay 67 to engage the camshaft clutch 68 and to position the reversing valve means 63 to urge the followers against cams 54—56. Depression of push button 65 is thus accompanied by a fluid-pressure jump feed of the work table 15 to position the work close to the tools. At the instant of starting (and referring to the program diagram of Fig. 6), the cam 58 will be on a high point so as to hold open a normally closed follower switch 66; therefore, the push button 65 will have to be held in until the camshaft 53 has advanced cam 58 past this high point. As the camshaft 53 rotates, the work table 15 is fed to the tools by fluid pressure, as limited by the contour of cam 54, with the motor 50 running at high speed; and, upon entrance of the boring tool 39 into the outer end of the valve-guide hole, as at 69 (Fig. 2), a first or rough boring cut may be made at high speed.

After the rough-boring cut, the boring tool 39 passes out the far end of the valve-guide hole, whereupon the speed-control cam 59 may be effective to change connections to motor 50, to run at slow speed. After the boring tool 39 clears the valve-guide hole, the tool 38 may make a plunge-type chamfering cut, to remove possible burrs or other irregularities at the outer lip of the valve seat 70; this chamfer cut will be understood to be controlled by the same fluid-pressure feed, as limited by cam 54. Having made the plunge-cut, the table-feed cam 54 may rise slightly, as at 71, to partially retract the chamfering tool 38 but nevertheless to maintain the boring tool 39 in clearance with the right (in the sense of the drawings) end of the valve-guide hole.

Once the tool head thus has been effectively partially retracted, the cross-cut feed cam 56 may be effective to project the push rod 22 and therefore to produce the valve seat 70 in a cross-cut operation. In making the first or rough cross-cut, it will be appreciated that cam 56 drives push rod 22 against the pressure-loading effected through cylinder 61. Movement of push rod 22 drives slide 23 downwardly and to the right (in the sense of Fig. 2) against the action of spring means 31, and against the action of centrifugal force on slide 23; since the center of gravity of the slide 23 and of means 26—26' carried thereby is above (in the sense of Fig. 2) the rotating axis, centrifugal force acting on the eccentric means may be utilized, in accordance with the invention, to implement the action of spring means 31. The extent and speed of the cross-cut feed may be selectably governed by appropriate sloping of the wedge or cam engagement at 33, as will be understood; and, in order that the above-mentioned combined centrifugal and spring forces shall produce minimal additional reactive loading on cam 56 by way of push rod 22, I prefer that the wedge slope at 33 shall be less than 45 degrees from the rotating axis and that said wedge slope shall be inclined backwards of a normal to the slope of the slide axis, as shown.

When the peak of the cross-cut feed cam 56 is reached, the cross-cut tool 26' will have run past the inner limit of the valve seat 70 and will be "cutting air." Retraction may then commence under the control of the fluid-pressure cylinder 61. In order that a definite cut may be taken during retraction, the table-feed cam 54 may include a slight rise, at 71', timed for effectiveness upon transition from the cross-cut feed slope 72 to the cross-cut retraction stroke 73. The cylinder 61 will cause positive retraction of the push rod 22, but retraction of tool 26' will be at the direct urging of spring means 31 and of the centrifugal forces acting upon the slide 23. It will be understood that, without further adjustment or control, retraction of tool 26' will be effective to produce a finish cross-cut on the valve seat 70.

Once the cross-cut tool 26' has been completely retracted, the table-feed cam 54 may cause work retraction; and upon a cam-controlled change of motor connection, such retraction may be accompanied by a high-speed finish-boring cut by the tool 39 after the tool 39 clears the forward edge 69 of the valve-guide hole, and upon full cam-actuation retraction, the rise in cam 58 may open the switch 66 so as to disengage the cam switch 66 and to cause pressure-actuated retraction of the work table 15 away from cam 54, as will be clear.

It will be appreciated that I have described an improved tool head for a boring or the like machine. My tool head will not only permit cross-cutting operations on a boring machine, but the same head may be utilized for more or less concurrent boring, chamfering, and similar operations. Such operations may be performed without requiring thrust-reaction on the work, and cross-cutting may be accomplished without relative longitudinal movement of the tool head and the work. My tool head is rugged and compact and lends itself to balanced operation at high speeds.

Although I have described my invention in detail for the preferred form shown, it will be understood that modifications may be made within the scope of the invention, as defined in the claims which follow.

I claim:

1. In a rotating-tool head of the character indicated, a body including means of support for rotation about a rotary axis, guide means on said body extending across said rotary axis and along a guide axis extending generally longitudinally and transversely relatively to said rotary axis, a tool slide embraced by said guide means and having its center of gravity on the side of said rotary axis that is on the rearwardly extending part of said guide means, longitudinally extending actuating means longitudinally slidably carried by said body on said rotary axis, a first cam wedge to be actuated by said actuating means and supported by said body for movement along said rotary axis, and a second cam wedge to actuate said tool slide and supported for movement with said tool slide, said cam wedges having mating sliding cam surfaces inclined at an angle intermediate said rotary axis and said guide axis, whereby there may be a linear relation between a movement of said actuating means and a feed of said tool slide, and whereby centrifugal force acting on said tool slide may substantially uniformly load said cam surfaces together for a plurality of feed positions of said tool slide.

2. A tool head according to claim 1, in which said surfaces are inclined less than 45 degres from said rotary axis.

3. A tool head according to claim 1, in which said surfaces are inclined intermediate said rotary axis and a normal to said guide axis.

ARTHUR F. PEKRUL.

REFERENCES CITED

The following references are of record in the file of this patent:

UNITED STATES PATENTS

| Number | Name | Date |
| --- | --- | --- |
| 1,794,390 | Trobeck | Mar. 3, 1931 |
| 2,383,050 | Esson | Aug. 21, 1945 |